United States Patent
Tirella et al.

(10) Patent No.: US 11,462,985 B2
(45) Date of Patent: Oct. 4, 2022

(54) SYSTEM FOR GENERATING A LINEAR MOVEMENT

(71) Applicant: GENERGO S.R.L., Como (IT)

(72) Inventors: Vincenzo Tirella, Coldrerio (CH); Simone Brunetti, Rome (IT)

(73) Assignee: GENERGO S.R.L., Como (IT)

( * ) Notice: Subject to any disclaimer, the term of this patent is extended or adjusted under 35 U.S.C. 154(b) by 0 days.

(21) Appl. No.: 17/601,353

(22) PCT Filed: Apr. 3, 2020

(86) PCT No.: PCT/IB2020/053184
§ 371 (c)(1),
(2) Date: Oct. 4, 2021

(87) PCT Pub. No.: WO2020/202087
PCT Pub. Date: Oct. 8, 2020

(65) Prior Publication Data
US 2022/0149711 A1    May 12, 2022

Related U.S. Application Data

(63) Continuation-in-part of application No. PCT/IB2019/052799, filed on Apr. 5, 2019.

(51) Int. Cl.
*H02K 33/16*    (2006.01)

(52) U.S. Cl.
CPC .................... *H02K 33/16* (2013.01)

(58) Field of Classification Search
CPC ....... H02K 33/16; H02P 25/06; H02P 25/062; H02P 25/064; H02P 25/066
See application file for complete search history.

(56) References Cited

U.S. PATENT DOCUMENTS

| | | |
|---|---|---|
| 2008/0001484 A1 | 1/2008 | Fuller et al. |
| 2018/0248458 A1 | 8/2018 | Amemiya |

FOREIGN PATENT DOCUMENTS

| | | | |
|---|---|---|---|
| EP | 3343738 A1 | 7/2018 | |
| TW | WO 2018010079 A1 | * | 1/2018 |

OTHER PUBLICATIONS

Hsu (WO 2018010079 A1) English Translation (Year: 2018).*

(Continued)

*Primary Examiner* — Tulsidas C Patel
*Assistant Examiner* — Robert E Mates
(74) *Attorney, Agent, or Firm* — Amster, Rothstein & Ebenstein LLP

(57) ABSTRACT

The present invention generally relates to a system for generating a linear movement, comprising an electromagnetically charged body (30, MM) free to move along a main direction, a static field generator (50, Bob), and two buffer elements (20,40; RM,RM; ML, ML; MA,MA; MF,MF). The movement of the electromagnetically charged body (30, MM) along the main direction is controlled by the static field generator (50, Bob) and by the buffer elements (20,40; RM,RM; ML, ML; MA,MA; MF,MF). The static field generator (50, Bob) is alternately supplied with a power profile such as to generate the displacement of the system in either orientation along said main direction with a frequency Ω obtained through the formula (I).

$$\Omega = A \cdot f(N)$$

with $A \in \mathbb{N} 1 \leq A \leq 5$ with $N \in \mathbb{N} 1 \leq N \leq 100$ (Continued)

-continued $$f(N) = \begin{cases} f^1(N) \, se \, N = 2k+1 \\ f^2(N) \, se \, N = 2k \end{cases}$$

with $k \in \mathbb{Z}$ $$f^1(N) = \left\{ \left(\sqrt{2} \cdot N\right) + (V_c \cdot 10^{-1}) + \left[0{,}005 \cdot \left(1 + \left\lfloor \frac{N}{2} \right\rfloor\right)\right] \right\} \pm g^1(n)$$

$$f^2(N) = \left\{ \left(\sqrt{2} \cdot N\right) + (V_c \cdot 10^{-1}) - \left[0{,}004 \left(1 + \frac{N}{2}\right)\right] \right\} \pm g^2(n)$$

with $V_c = $ costante $di$ Viswanath $\cong 1{,}13198824$ $$g^1(n) = \frac{n}{2} \cdot f^1(N) \cdot 10^{-2}$$

with $g^2(n) = \frac{n}{2} \cdot f^2(N) \cdot 10^{-2} \, n \in \mathbb{N} \, 0 \leq n \leq 30$.

11 Claims, 8 Drawing Sheets

(56) References Cited

OTHER PUBLICATIONS

International Search Report & Written Opinion received for the PCT Application No. PCT/IB2020/053184, dated Jul. 16, 2020, 9 pages.
International Preliminary Report on Patentability received for the PCT Application No. PCT/IB2020/053184, dated Sep. 28, 2021, 6 pages.

\* cited by examiner

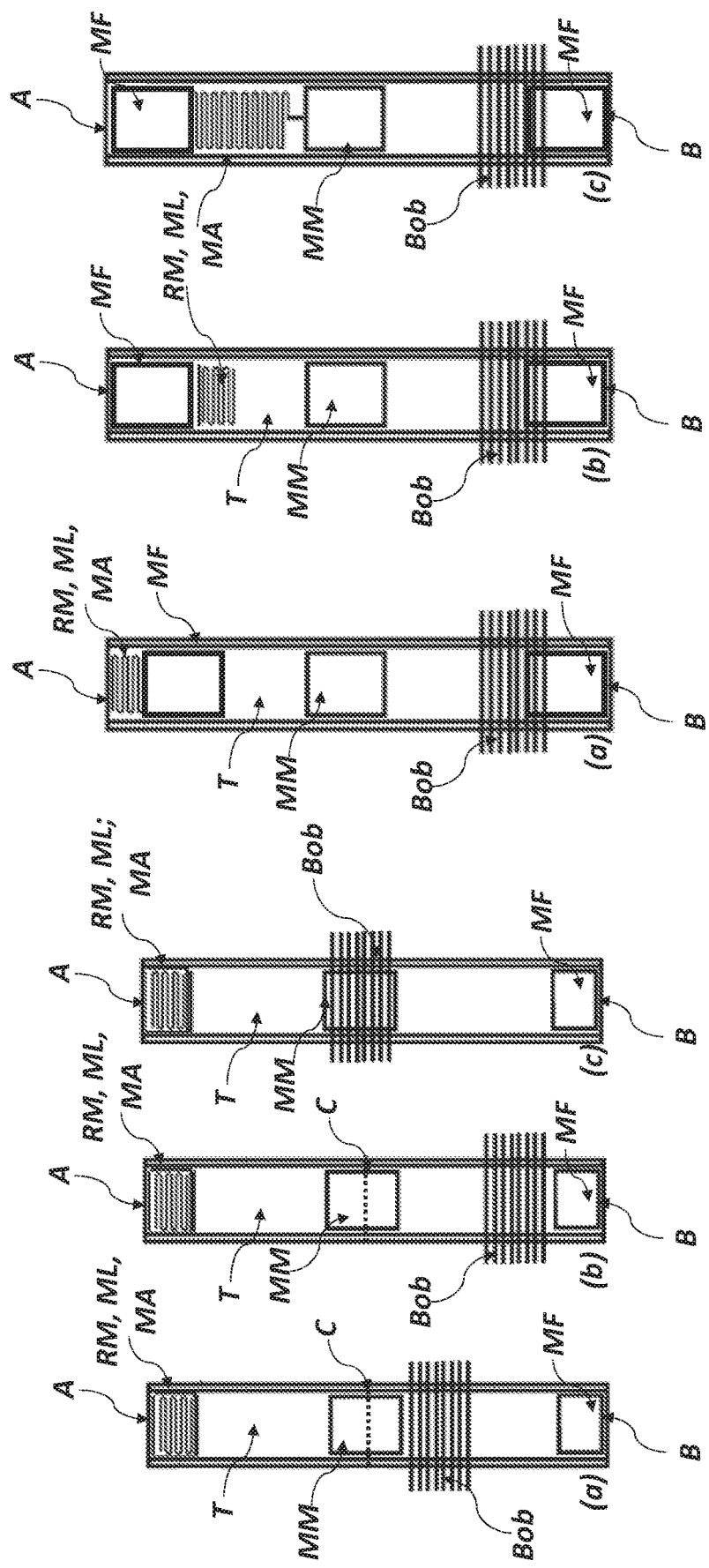

SYSTEM FOR GENERATING A LINEAR MOVEMENT

CROSS REFERENCE TO RELATED APPLICATIONS

This application claims benefit under 35 U.S.C. § 371 to international application No. PCT/IB2020/053184 filed on Apr. 3, 2020, which claims priority to international application No. PCT/IB2019/052799 filed on Apr. 5, 2019, the contents of which are incorporated by reference in their entireties.

FIELD OF THE INVENTION

The present invention relates in general to a linear motor. In particular, the present invention relates to a motor which exploits an electromagnetically charged body to put a system which comprises it into motion along a main direction. In particular, the linear motor described herein allows a movement in one orientation in one main direction of the system. The linear motor described herein performs movements in one direction as a result of external bias, in which such movements go beyond simple vibration.

PRIOR ART

Current motors are based on two general principles to generate motion and may be divided into two macro categories of movement: friction motors and variable-mass motors.

Friction motor means any motor which, regardless of the power method used, generates a movement which is mechanically transferred to an external object or surface and which generates a friction by means of this movement between the object to which the motor is coupled and the external object or surface.

For example, a motor of a car transmits the movement generated by the motor to the wheels of the car, whereby generating the movement of the car on the road as a result of the friction with the surface of the road. Indeed, the car moves by means of this friction generated between the wheels and the asphalt. Similar examples could be the wheels of trains with the rails or even the magnetic levitation system of trains.

The second macro-category relates to variable-mass motors, i.e. motors which "launch mass" in the direction opposite to the movement that they must perform and are based on the action/reaction principle. Emblematic examples of this type of motors are rockets which emit a stream of particles in the direction opposite to the movement they are intended to perform.

Document US 2008/001484 A1 describes an electromagnetic vibrator device comprising:

(a) at least one movable magnet, able to move in an axial direction, wherein the movable magnet is magnetized in the axial direction;

(b) two bumper magnets arranged axially in-line with the movable magnet, wherein the bumper magnets are oriented such as to magnetically repel the movable magnet, and wherein the movable magnet is arranged between the bumper magnets; and (c) at least one field coil for causing the movable magnet to move in the axial direction.

In particular, document D1 describes a device used to generate a linear vibration, which can be used, for example, in mobile phones or portable electronic devices. Document US 2018/248458 describes a vibrating motor with a stable vibrating portion which can be used in various electronic devices.

Finally, document EP 3 343 738 A1 describes a flexible haptic actuator, which substantially comprises the same parts as those described in the two preceding documents.

SUMMARY OF THE INVENTION

The motor suggested herein is not based on either of the two macro principles outlined above.

Indeed, the linear motor described herein does not emit mass and does not use friction to move but instead generates a force which pushes it in the desired direction.

Furthermore, unlike friction motors, the self-propulsive motor has no reachable speed limit because it generates constant acceleration and therefore in absence of friction (e.g. in space) it can ideally reach any speed.

BRIEF DESCRIPTION OF THE DRAWINGS

Further features and advantages of the invention will become apparent from the reading of the following description provided by way of non-limiting example, with the aid of the figures shown on the accompanying drawings, in which:

FIGS. 7 to 18 show different embodiments of the system according to the present invention.

Figure 6:
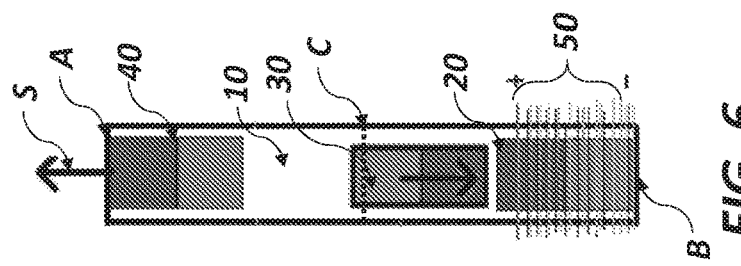
FIGS. 2 to 6 show the system in successive steps which lead to the movement of the system.

The parts according to the present description are shown in the drawings, where appropriate, with conventional symbols, showing only those specific details which are pertinent to understanding the embodiments of the present invention, so as not to highlight details which will be immediately apparent, to those skilled in the art with reference to the description given herein.

DETAILED DESCRIPTION OF THE INVENTION

Figure 1:
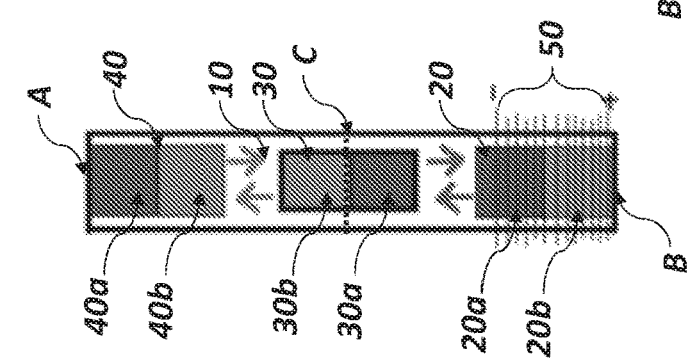
FIG. 1 shows an example of system according to the present invention.

With reference to FIG. 1, in general the motor or the moving system according to the present invention consists of an electromagnetically charged body which moves within a delimited volume of space being accelerated and decelerated electromagnetically in controlled manner during its movement within said volume of space.

Such accelerations/decelerations generate a force on the volume inside which the mass moves and allow the volume of space to move.

An example of a first embodiment is shown in FIG. 1.

In FIG. 1, it is possible to identify the basic elements of the solution suggested herein, i.e. a tube 10, e.g. a hollow cylinder, which contains three magnets 20, 30 and 40 inside, of which one (reference numeral 30) is movable and two (reference numerals 20 and 40) are fixed, and an electromagnet or coil 50. The two fixed magnets 20 and 40 are fixed inside the tube 10 at its two opposite ends A and B. The third movable magnet 30 is arranged in the central portion C of the tube 10. The coil 50 is anchored to the tube 10 on its outer portion. In the illustrated example, the coil 50 is wound around and surrounds the tube 10 starting from the end portion B and extends for about one quarter of the length of the tube 10. In particular, the coil 50 is positioned on the outside of the tube and surrounds the portion of pipe 10 which contains the fixed magnet 20. The three magnets 20,30,40 are arranged so as to show opposite poles facing each other. In particular, in the condition of equilibrium illustrated in FIG. 1, it results that the first fixed magnet 20 is positioned so that its positive pole 20*b* faces towards the outside of the tube 10, i.e. towards the end portion B of the tube 10, and its positive pole 20*a* faces towards the central portion C of the tube 10. The second movable magnet 30 is positioned inside the tube 10 in a central portion C so that its negative pole 30*a* faces the negative pole 20*a* of the first fixed magnet 20. Finally, the third magnet 40 is positioned so that its positive pole 40*b* faces towards the inside of the tube 10, i.e. towards the central portion C of the tube 10, and its negative pole 40*a* faces towards the outside of the tube 10, i.e. towards the end portion A of the tube 10. In this manner, the third fixed magnet 40 is positioned inside the tube 10 so that its positive pole 40*b* faces the positive pole 30*b* of the second movable magnet 30.

In FIG. 1 shows the condition of equilibrium. In particular, the two fixed magnets 20,40 hold the movable magnet 30 in position by virtue of the repulsive forces of the poles of the same sign facing one another. Therefore, the repulsive forces between the poles of the same sign mutually repel the magnets. In particular, the two negative poles 20*a* and 30*a* repel each other and the positive poles 30*b* and 40*b* repel each other. Consequently, the movable magnet 30 remains stationary in the central portion C of the tube 10 because the two repulsive forces that are generated with respect to two fixed magnets 20,40 are balanced. In the example of FIG. 1, the coil 50 is not powered and therefore the system is in the condition of equilibrium in which the movable magnet 30 is stationary in the center of the tube 10 in the central portion C. Naturally, the description provided hereto also applied in the dual case in which the magnets assume reversed positions with respect to the poles. Therefore, the fixed magnet 20 has the positive pole 20*a* facing towards the outside of the tube 10 (end portion B) and the negative pole 20*b* facing towards the central portion C of the tube 10, the movable magnet 30 has its positive pole 30*b* facing towards end portion B and the negative pole 30*a* facing towards end portion A, and the fixed magnet 40 has its negative pole 40*a* facing towards central portion C of the tube 10 and its positive pole 40*b* facing towards end portion A. Also in this case, the repulsive forces between the poles of the same sign repel the magnets to each other.

System operation will now be described step-by-step with reference to FIGS. 2-5.

Figure 2:
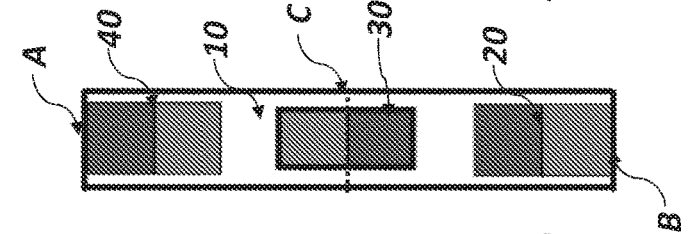

FIG. 2 shows the initial condition of equilibrium. As mentioned, in this condition, the movable magnet 30 is stationary in its condition of equilibrium in the central portion C of the tube 10. Such a movable magnet 30 is held stationary by the repulsive forces which are generated between the poles of the same sign by virtue of the orientation of the two fixed magnets 20 and 40.

So, in time t0 there is a situation of equilibrium.

Figures 3, 4:
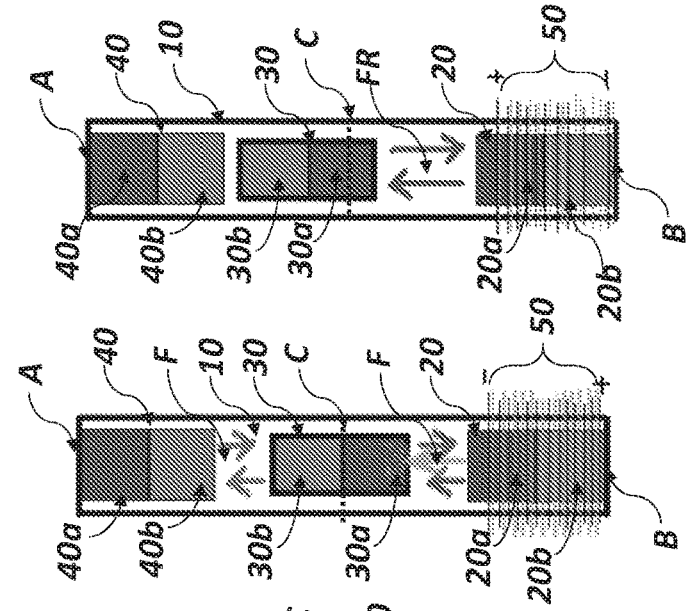

With reference to FIG. 3, the coil 50 is added wound on the end portion B of the tube 10. In particular, the coil 50 is wound on the end portion of the tube 10 at the fixed magnet 20. Initially, such a coil 50 is not powered and in FIG. 3 the situation of equilibrium, also illustrated in FIG. 2, remains. In other words, the movable magnet 30 is in central position held in equilibrium by the repulsive forces F generated by the two fixed magnets 20 and 40.

At time t1, there is the activation of a coil which generates an electromagnetic field.

In FIG. 4, the coil 50 is powered, e.g. by a square-wave or a sinusoid or a sawtooth waveform pulse, and the movable magnet 30 moves due to the increased magnetic field generated by the coil 50 in the direction towards the end of the tube 10. In particular, the movable magnet 30 approaches the fixed magnet 40 pushed by the repulsive force FR which is created between the poles of the same sign 20*a* and 30*a* of the two magnets 20 and 30. Consequently, the movable magnet 30 moves towards the fixed magnet 40 (in the direction towards end A) for as long as the repulsive force generated by approaching the two poles of the same sign 30*b* and 40*b* stops the movable magnet 30.

Subsequently, at time t2, the movable magnet 30 interacts with the electromagnetic field generated by the coil 50 and moves from the position of equilibrium closer to the fixed magnet 40 (an embodiment is shown in the example, but the dual embodiment with the inversion of the power powered to the coil 50 may also be considered).

More in detail, by energizing the coil 50, an increase of the magnetic field is generated, which increases the repulsive force between the movable magnet 30 and the fixed magnet 20 and which moves the movable magnet 30 in the direction towards the fixed magnet 40. The movable magnet 30 acquires a kinetic energy which is transferred to the entire system in the instant of maximum approach before inverting the motion of the mobile magnet 30.

Figure 5:
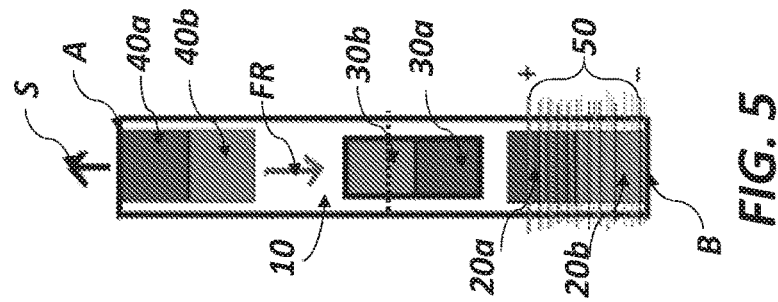

At time t3, see FIG. 5, the coil 50 is either switched off or the polarity is reversed or the intensity is lowered and the central magnet 30 being in a position other than its normal position of equilibrium receives a force which tends to take it back to a situation of equilibrium and the complete system (tube 10, magnets 20,30,40 and coil 50) receives an equal and opposite force in the opposite direction.

With reference to FIG. 6, at time t4, the movable magnet 30 being accelerated, would tend in principle to move beyond its normal position of equilibrium and further approach in the direction of the fixed magnet 20, which would repel it again beyond the position of equilibrium and if left in this situation, a series of increasingly smaller oscillations of the mobile magnet 30 would occur until it reaches the position of equilibrium again.

Instead, the coil 50 is reactivated in a precise moment so as to decelerate the movable magnet 30 and reject it in the situation at time t2, see FIG. 4.

At time t5, steps from t2 to t5 are repeated so as to hold the system in motion.

In particular, the displacement of the system consisting of tube 10, magnets 20,30,40 and coil 50 occurs in the direction indicated by the arrows S in FIGS. 5 and 6.

The advancement occurs by effect of the mechanical thrust of the mobile magnet 30 on the fixed magnet 40. In particular, to prevent wear of the magnets, the impact between them is avoided and the repulsion distances the two magnets when they are taken too close.

In brief, the system generates a series of linear movements by providing a series of pulses (square-wave, sinusoid, sawtooth wave) with a given frequency as power for coil 50, i.e. an impulsive power with a peak which then descends. In particular, by supplying current to the coil 50, a linear movement of the system is obtained due to the repulsive forces between the poles with the same charge of magnets comprised in the system. Such a linear movement is also achieved in vacuum and therefore the movement is not due to vibrational effects or friction.

Therefore, the solution described herein allows obtaining a linear movement by energizing the coil 50 by means of a generator (e.g. a battery). The movement obtained depends on the pulses of the waveform by which the coil 50 is powered. The power of the coil 50 allows obtaining an unbalanced thrust in a given direction with respect to the main axis so as to move the entire system in a direction. Therefore, obtain different responses of the system can be obtained by choosing different pulse amplitude and frequency for powering the coil 50.

The powering of the system is alternating and not direct so as to generate the movement of the motor and can be adjusted in various range of frequencies and with various waveforms (by way of example square-wave, sawtooth, sinusoidal, etc.) so as to generate various types of thrust along the two axes and various types of accelerations of the system.

Some of possible embodiments of the system described herein will now be described.

Figure 7:
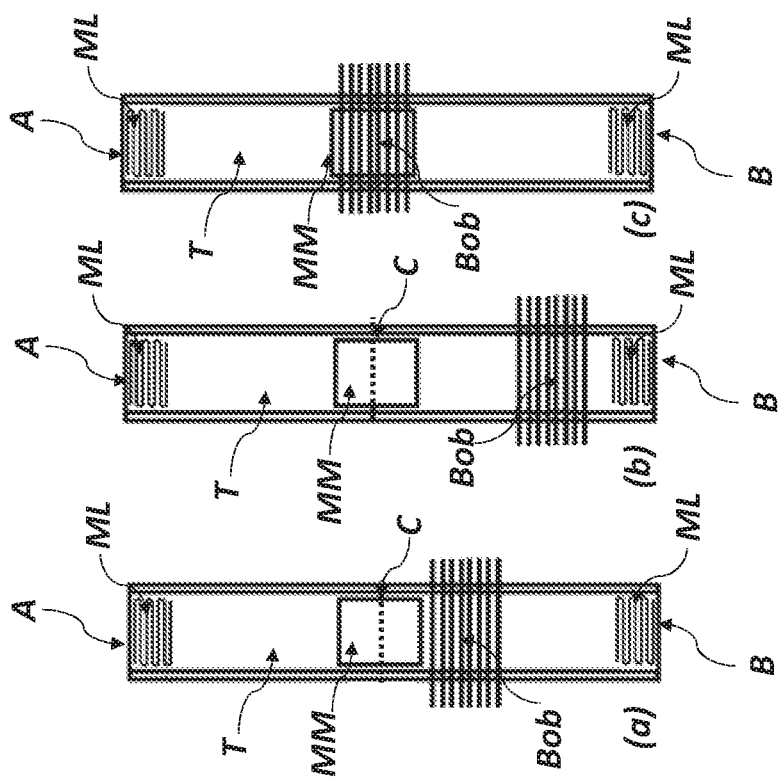

The simplest diagram of the system is shown in FIG. 7. In particular, in this case, there is a movable magnet MM inserted in a tube T, e.g. a hollow cylinder, closed at its ends A and B and provided with two mechanical bumpers RM at the ends of the tube T, and a single coil Bob.

The coil Bob may assume different positions on the tube T. In particular, in FIG. 7a), the coil Bob is in the first portion of the tube T just under the central portion C of the tube T and under the movable magnet MM. Conversely, in FIG. 7b), the coil Bob is again located in the first portion of the tube T under the movable magnet MM and near the end B of the tube T. Finally, in FIG. 7c), the coil Bob is located in central portion C of the tube T and surrounds the tube T in the rest position of the movable magnet MM.

In the operation of the system in the three cases a), b) and c), according to the position of the coil, only the motor efficiency and the frequency ranges changes, because the principle is substantially the same.

The two mechanical bumpers RM can be made of an elastic material, such as silicone rubber (see FIG. 7).

The tube T, as already mentioned, may be, for example, a hollow cylinder with circular section or a tube with a square, rectangular, oval, hexagonal or other type of section.

In one or more alternative embodiments, the two mechanical bumpers RM can be made in the form of two elastic elements or springs ML (see FIG. 8) positioned in the two end portions A and B of the tube T. Again in this case, the coil Bob may assume different positions as shown in the embodiments to (b) and (c) in FIG. 8. The coil Bob can assume the same positions as described for FIG. 7, namely:
in the first portion of the tube T just under the central portion C of the tube T and under the movable magnet MM;
in the first portion of the tube T under the movable magnet MM and in proximity of the end B of the tube T; or
in the central portion C of the tube T and surrounds the tube T at the rest position of the movable magnet MM.

Figure 8:
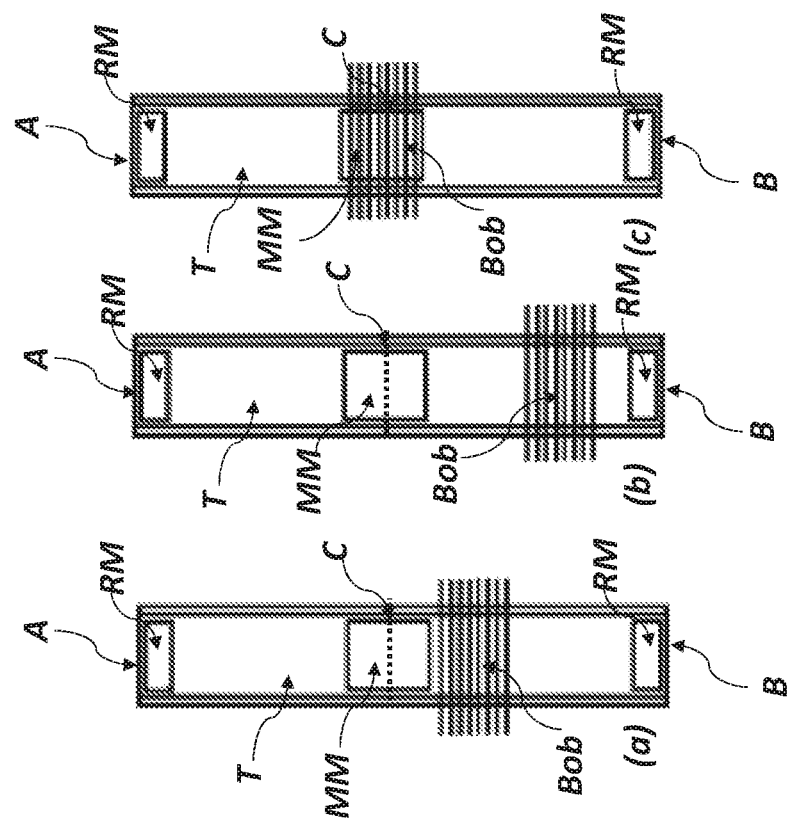
Figure 9:
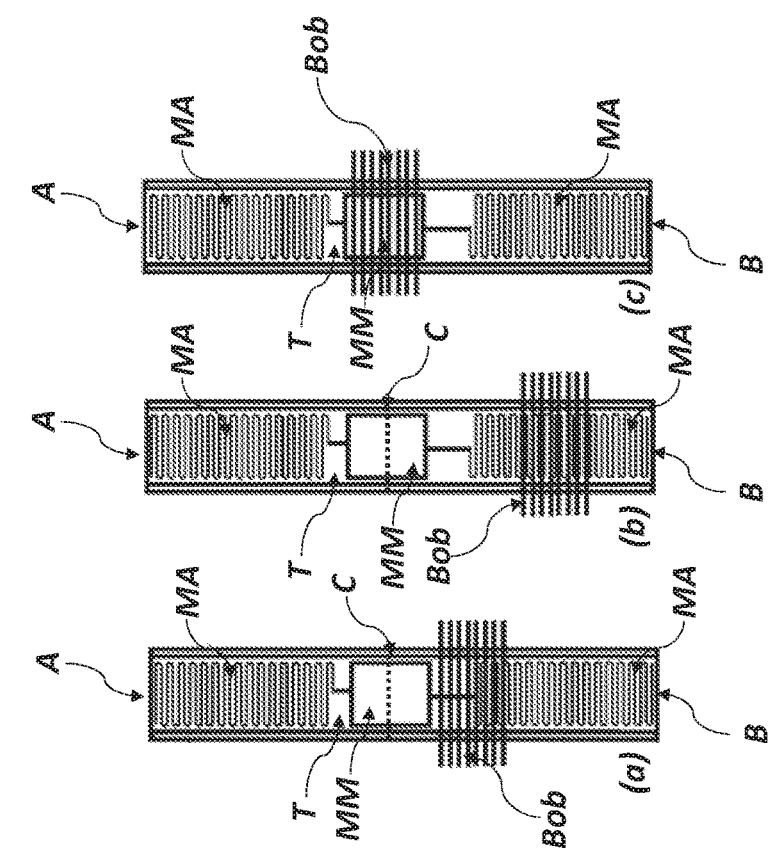

Alternatively, as shown in FIG. 9, the movable magnet MM can be maintained in a position of equilibrium by a system of springs Ma. In particular, springs Ma are anchored to the end portions A and B of the tube T. Also in this case, the coil Bob may assume different positions, as shown in embodiments a) b) and c) of FIG. 7 and FIG. 8.

Figure 10:
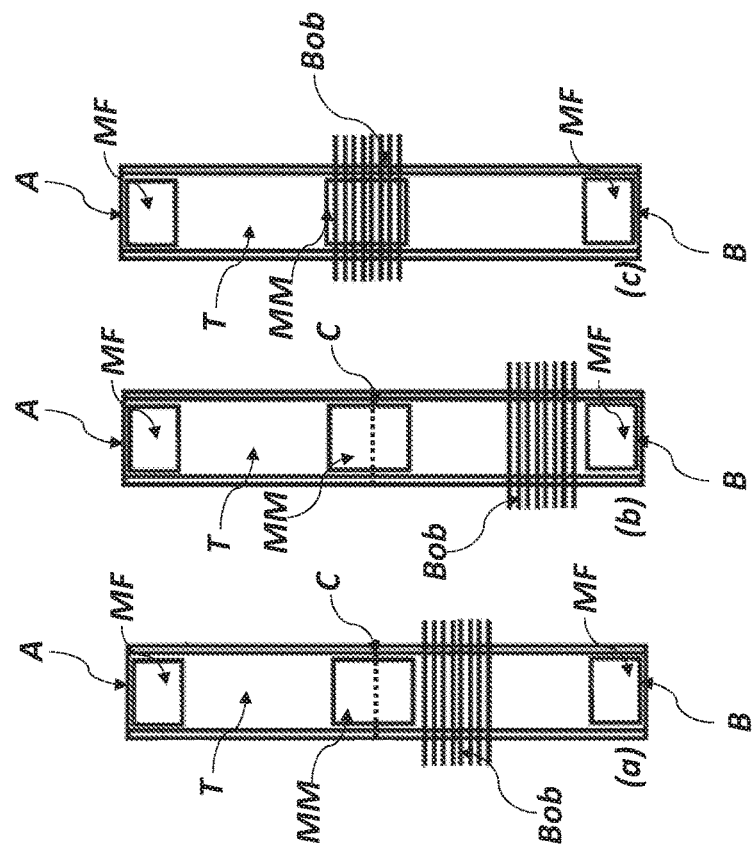

Other possible embodiments are shown in FIG. 10. In particular, in this case the system comprises a tube T closed at ends A and B with a movable magnet MM inside in central portion C and two fixed magnets MF blocked at the ends A and B of the tube T. Again, in this case, there is a single coil Bob wound on the tube T in the three possible positions:
in the first portion of the tube T just under the central portion C of the tube T and under the movable magnet MM;
in the first portion of the tube T under the movable magnet MM and in proximity of the end B of the tube T; or
in the central portion C of the tube T and surrounds the tube T at the rest position of the movable magnet MM.

In the embodiments in FIG. 10, the magnets can also have mutually different dimensions.

Further embodiments (see FIGS. 11 and 12) can be obtained by mixing the features of the solutions of FIG. 10 with one of the three variants (a,b,c) of FIG. 7, FIG. 8 or FIG. 9. In particular, there may be a mechanical buffer RM made elastic rubber at the first end, a spring bumper ML or a spring MA coupled between the tube T and the movable magnet MM and a fixed magnet MF at the other end B of the tube T. Alternatively, the elements may be mutually reversed at the two ends A and B of the tube T.

Further embodiments (see FIGS. 11 and 12) can be obtained by mixing the features of the solutions of FIG. 10 with one of the three variants (a,b,c) of FIG. 7, FIG. 8 or FIG. 9. In particular, there could have a closed tube T with a movable magnet MM inside in the central portion C and two fixed magnets MF fixed at the ends A and B of the tube T. The magnets can also have mutually different dimensions. Again, in this case, there is a single coil Bob. In these alternative embodiments, there may be a mechanical buffer RM, which may be made of an elastic material, such as silicone rubber, between the end of the tube T and the fixed magnet MF. In a variant, there may be one or two springs ML or a system of springs MA which hold the fixed magnet MF in a position of equilibrium. Naturally, the fixed magnet MF and mechanical buffer RM pair may only be from end A or from both ends A and B.

According to a further variant, there may be two fixed magnets MF secured at the ends A and B of the tube T and two mechanical buffers RM, which may be made of an elastic material, such as silicone rubber, between the fixed magnets MF and the movable magnet MM. In other alternative embodiments, there may be two springs ML or a system of springs MA, which hold the central magnet in a position of equilibrium, or any combination of the preceding elements, between the fixed magnets MF and the movable magnet MM.

Only some of the possible variants which have been described are shown in the figures.

Figure 13:
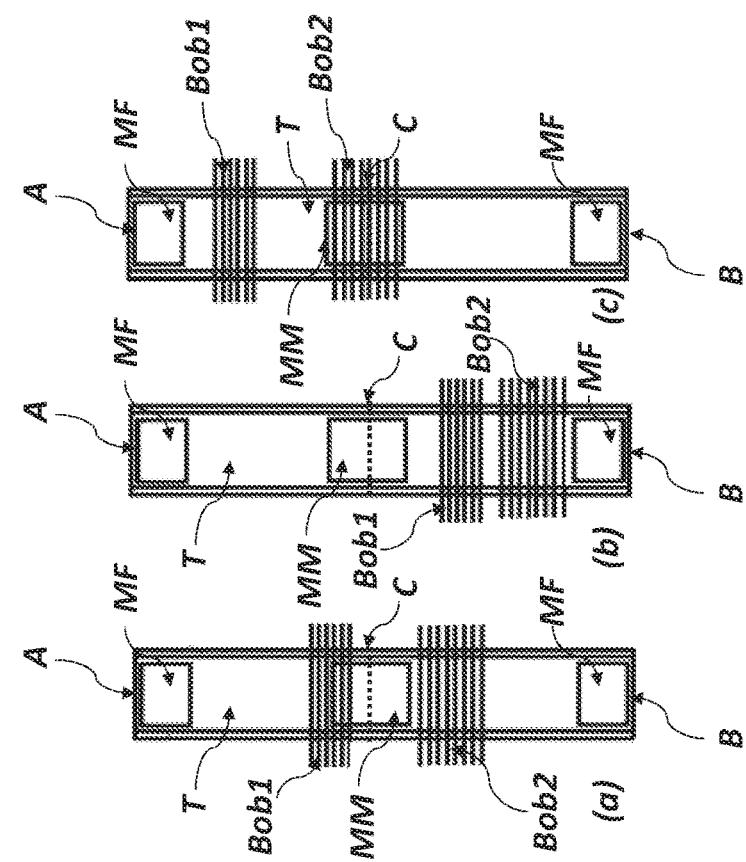

In various other embodiments, see for example FIG. 13, the system comprises a closed tube T with a movable magnet MM in its central portion C, at its two ends A and B, two fixed magnets MF fixed to the ends of the tube T and a pair of coils Bob1 and Bob2. Figures a), b) and c) show three examples of positioning of the two coils Bob1 and Bob2. In the illustrated example, the two coils Bob1 and Bob2 have a different number of windings, but embodiments can be envisaged in which the two coils Bob1 and Bob2 are equal. Alternatively, it is possible to think of other distributions of the two coils Bob1 and Bob2 along the tube T.

By adjusting the size (number of windings and size, supply and frequency of the two coils Bob1 and Bob2), it is possible to adjust the acceleration of the system more efficiently (see FIG. 13). The magnets can also have mutually different dimensions.

Further embodiments are obtained by combining the features of the solutions of FIG. 13 with one of the three variants (a,b,c) of FIG. 7, FIG. 8 or FIG. 9. In particular, there could be an embodiment with a pair of coils Bob1 and Bob2, at the first end A, a mechanical buffer RM made of elastic rubber, a spring bumper ML or a spring MA coupled between the tube T and the fixed magnet MF, then the movable magnet MM and finally a fixed magnet MF fixed to the other end B of the tube T. Alternatively, the elements may be mutually reversed at the two ends A and B of the tube T.

Further embodiments are obtained by combining the features of the solutions of FIG. 13 with one of the three variants (a,b,c) of FIG. 7, FIG. 8 or FIG. 9. In particular, there could be an embodiment with a pair of coils Bob1 and Bob2, a closed tube T with a movable magnet MM inside in the central portion C and two fixed magnets MF fixed at the ends A and B of the tube T. The magnets can also have mutually different dimensions. In these alternative embodiments, there may be two mechanical buffers RM, which may be made of an elastic material, such as silicone rubber, between the ends A and B of the tube T and the fixed magnets MF. In a variant, there may be two springs ML or a system of springs MA which hold the magnets fixed MF in a position of equilibrium.

In all embodiments indicated herein, system acceleration can be adjusted more efficiently by adjusting the size, the number of windings and magnitude, the power and the frequency of the two coils Bob1 and Bob2. The magnets can also have mutually different dimensions.

Figure 14:
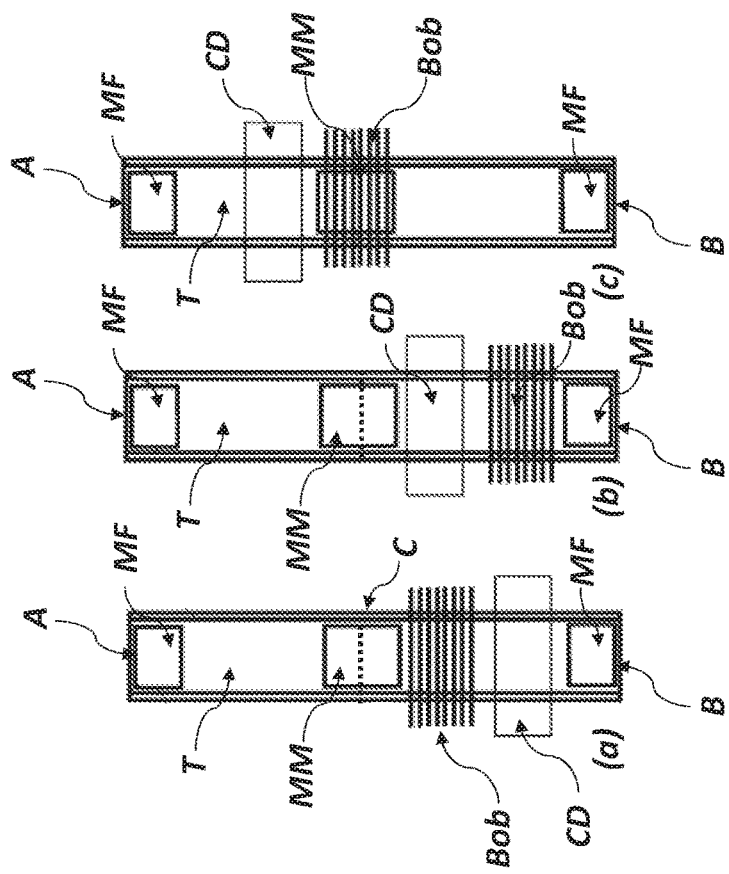

With reference to FIG. 14, a further embodiment can be considered in which a single coil Bob is present wound on a closed tube T with a movable magnet MM inside in a central portion C and two fixed magnets MF fixed at the ends A and B of the tube T. In this alternative embodiment, a diamagnetic cover CD of the tube T is also provided in a position of the tube T between the two fixed magnets MF, with the purpose of working as a "magnetic brake" to decelerate the movement of the movable magnet MM during the step of returning to the position of equilibrium. The magnets can also have mutually different dimensions.

A variant of the embodiment shown in FIG. 14 provides a pair of coils Bob1 and Bob2 wound on a closed tube T with a movable magnet MM inside in a central portion C and two fixed magnets MF fixed at the ends A and B of the tube T. In this embodiment, a diamagnetic cover CD of the tube T is further provided placed in a position of the tube T between the two fixed magnets MF, with the purpose of working as a "magnetic brake" to decelerate the movement of the movable magnet MM made during the step of returning to position of equilibrium. The magnets can also have mutually different dimensions and the "magnetic brake" CD may be positioned or either between the two coils Bob1 and Bob2 or between the coils Bob1 and Bob2 and one end (A or B) of the closed tube T.

More in detail, the diamagnetic cover CD which works as magnetic brake is a cover of diamagnetic material which is used to brake the movable magnet MM when it moves inside the area of the tube T covered by said diamagnetic cover CD. The diamagnetic cover CD may be made of copper, aluminum, graphite or any strongly diamagnetic material and may be either passive (i.e. a simple cover not powered) or active, i.e. a copper, graphite or aluminum coil which is activated shortly before the passage of the movable magnet MM. For example, the diamagnetic cover CD may be a hollow cylinder fitted above the tube T.

Alternatively, the brake action can be obtained also in the case of a single coil by reversing the polarity of the power supply, or otherwise by providing a pair of coils, one for launching or accelerating and one for braking.

A further embodiment of the solution described herein is described with reference to FIG. 15. In particular, in this case, there are a number N of coils Bob1, Bob2, . . . , BobN, wound on a closed tube T with a movable magnet MM inside in the central portion C and two fixed magnets MF fixed at the ends A and B of the tube T. System acceleration can be adjusted more efficiently by adjusting the size, the number of windings and the magnitude, the power and the frequency of the N coils. The magnets can also have mutually different dimensions.

In detail, the purpose of providing a plurality of N coils is to make a situation similar to a Gauss rifle in the step of "launching" of the mobile magnet MM towards one of the two fixed magnets MF and thus of accelerating the movable magnet MM towards a direction and to work as magnetic brake during step of returning of the mobile magnet MM in the opposite direction. Therefore, a coil generates a force at the base of its generic shape, according to the position with respect to the movable magnet MM and as a function of the time in which it is activated.

In particular, a Gauss rifle is a barrel which uses magnetic or electromagnetic acceleration to launch metal bullets at very high speed, by virtue of a linear motor arranged on a common axis.

Using multiple coils, it is possible to manage the thrust and the accelerations and decelerations of the mobile magnet MM controlling them better. It is also preferable to manage each coil individually with a power supply device and a square-wave generator of adjustable frequency. Therefore, it would be preferable to have a series of coils as narrow as possible and with large diameter, so as to generate powerful magnetic fields. Conversely, an intermediate compromise must be found to avoid making the system too heavy. A good middle ground may be to use two or three offset coils as pulses so as to avoid making the system too heavy but still manage the accelerations and decelerations with good precision.

Figure 15:
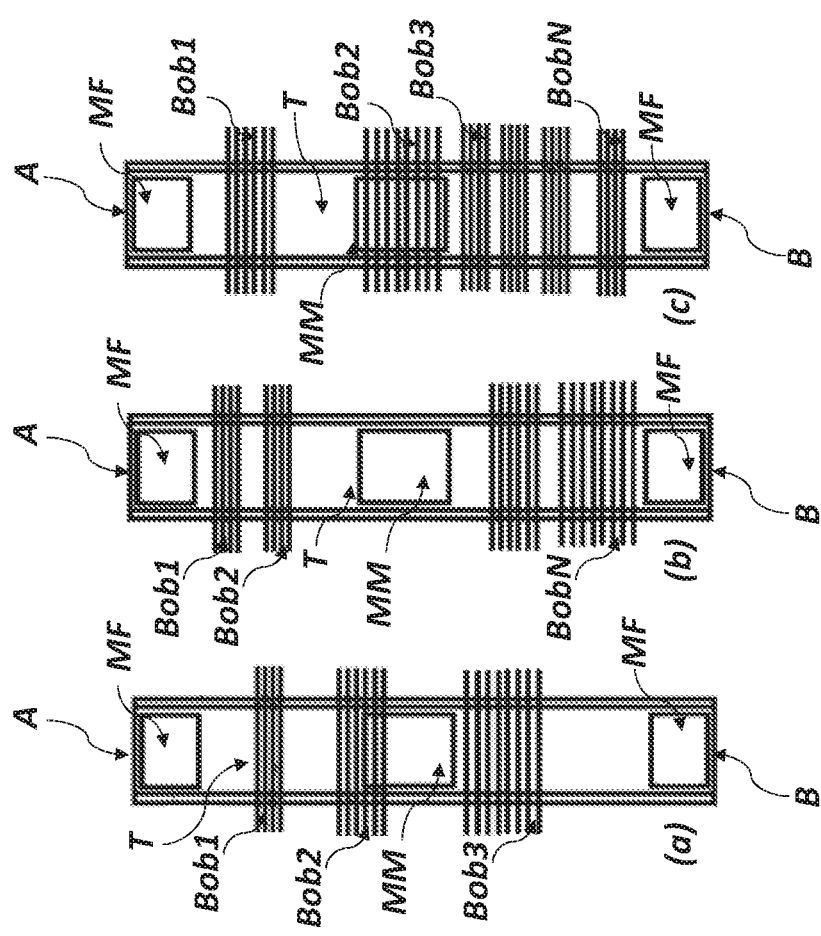

Further embodiments can be obtained from the embodiments shown in FIG. 15 to which one or more diamagnetic covers CD of the tube T are added in various positions of the tube T between the two fixed magnets MF, with the purpose of working as "magnetic brake" to decelerate the movement of the movable magnet MM during the step of returning to position of equilibrium. Also in this case, the magnets may have mutually different sizes.

Figure 16:
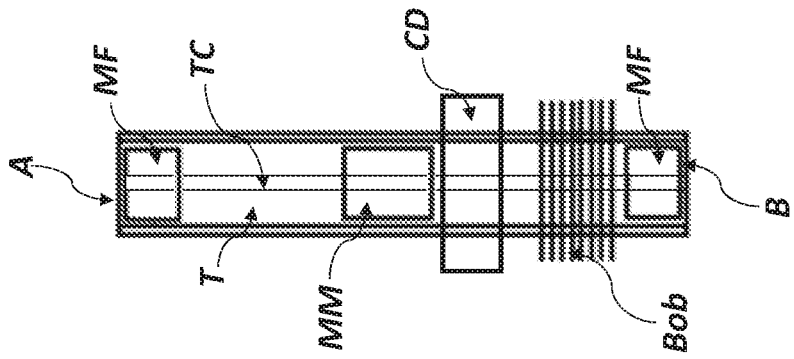

A further variant, which can be applied to all of the embodiments described above, envisages the use of a central tube TC made of diamagnetic material as a further magnetic brake. FIG. 16 shows an example of embodiment which envisages the use of a central tube TC made of diamagnetic material as a further magnetic brake.

Figure 17:
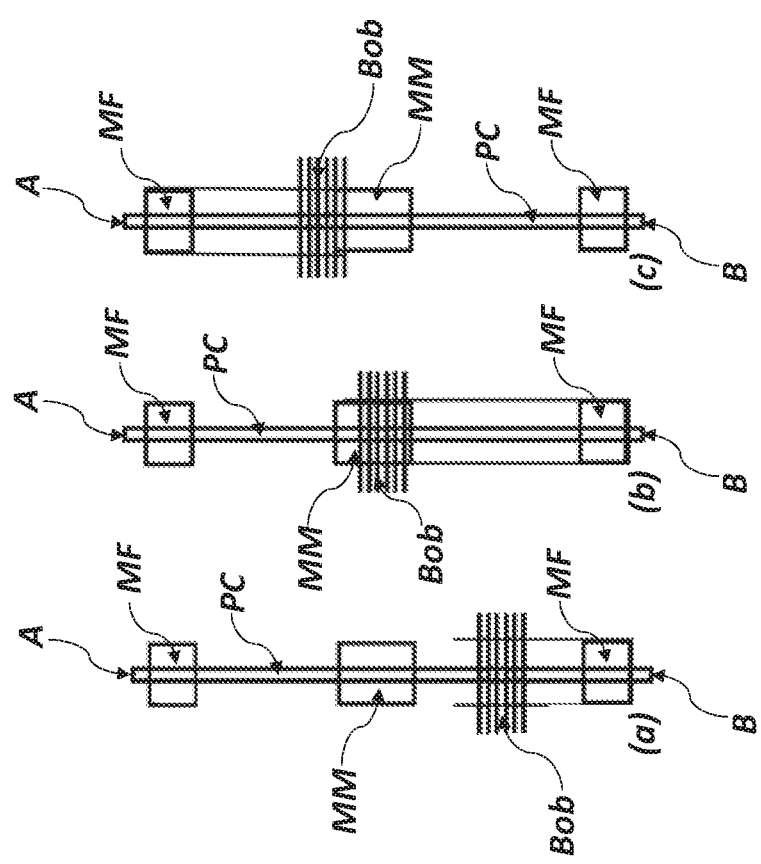

With reference to FIG. 17, a further embodiment of the system according to the invention is described. In this embodiment, a central pin PC is provided on which a movable magnet MM slides (which in this embodiment is pierced in the center) and to which the two fixed magnets MF are fixed at ends A and B.

Naturally, all the variants previously described can also be applied to this embodiment.

In particular, the embodiments are described on the basis of an ever-greater efficiency, the multi-coil system with two fixed magnets is the most efficient, while the first system with a single magnet, a single coil and mechanical repulsion means is the least efficient.

Finally, it is possible to make a system consisting of multiple systems which can be assembled in order to allow the movement in the vertical direction or in various directions.

Substantially, the system herein described behaves as a Gauss rifle in which there are two plugs at the end of the rifle (tube) and the magnet, which replaces the bullet, is repeatedly made to approach and/or come into contact with the buffer elements (springs, magnets etc.), in particular one of them in a given direction and sense, for transferring kinetic energy and putting the entire system into motion. Naturally, it is possible to imagine moving systems which exploit circular motion, with appropriate transformation means.

An example of application will now be described. In the described example, the tube T is made of plastic material which is resistant to impacts and high temperatures. In alternative embodiments, the tube T may also be made of ceramic, sintered ceramics, wood, cardboard, vulcanized fiber or wood or cardboard soaked in epoxy resin.

In particular, the ceramic has the advantage of being extremely resistant to high temperatures, mechanically strong and not being heavy, in addition to the fact that does not suffer from aging phenomena.

Furthermore, sintered ceramics have the same advantages as traditional ceramics but may possess superior features to those of traditional ceramics.

Wood has a low specific weight and a low thermal transmission which prevents the transmission of the heat generated by the coils to the central magnet.

Conversely, carbon has features and advantages similar to wood but a lower specific weight.

Vulcanized fiber has features similar to wood and carbon but has superior mechanical strength and does not display structural imperfections being a homogeneous material; it is also an excellent electric isolator.

Wood, carbon or vulcanized fiber soaked in epoxy resin have the same features as the three previous materials but a possibly higher structural strength.

Moreover, in further embodiments, the tube T could also be made of aluminum, graphite or metal, but it appears that strongly diamagnetic or ferromagnetic materials may in some cases limit system performance.

Therefore, antiferromagnetic materials or materials which do not magnetize are preferable, such as ceramics, plastics, wood and paper.

In the considered embodiments, the tube T has a length which may vary from 0.5 cm to 300 cm and an inner diameter comprised between 0.1 mm and 600 mm. The magnets used (MM AND MF) are preferably selected with a high degree of magnetization and a good thermal resistance due to the eddy currents which might be generated inside the magnet itself during operation.

Figure 18:
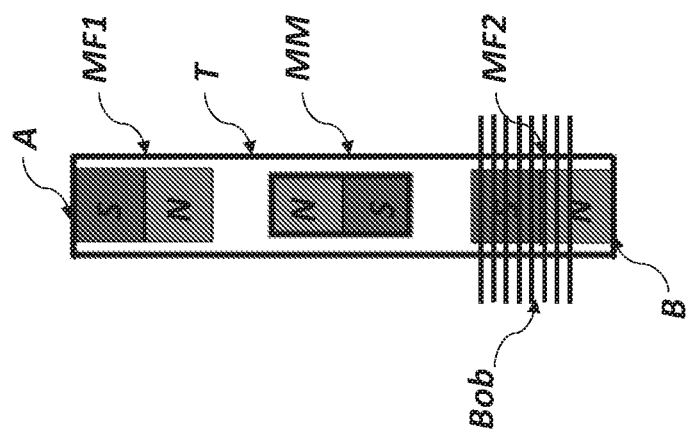

By way of example, see FIG. 18, a plastic tube T of 130 mm in length may be used with an inner diameter of 11 mm and an outer diameter of 15 mm. Two neodymium magnets MF with axial magnetization N52 of 10 mm in diameter and 35 in height are fixed by means of epoxy glue at the two ends A and B of the tube T.

The two magnets MF are fixed so that the North Pole (or positive pole) of one of the two magnets MF1 faces inside the tube and the South Pole (or negative pole) faces outwards, while the other MF2 is fixed so that the South Pole (or negative pole) faces towards the inside of the tube T and the North Pole (or positive pole) faces outwards.

A movable magnet MM, equal to the previous ones MF1 and MF2, which is held in magnetic levitation by the repulsive force generated by the other two magnets MF1 and MF2, is placed inside the tube T between the two magnets MF1 and MF2.

For example, an enameled copper wire coil Bob with diameter of 0.25 mm may be wound about the tube T so as to obtain the following overall dimensions: length between 10 and 25 mm, outer diameter 25 mm. The coil Bob is positioned between the movable magnet MM and one of the two fixed magnets MF1 and MF2, in particular in FIG. 18 between MM and MF2. In the described embodiment, the coil Bob is located in this case at about 7 mm from the end portion of the movable magnet MM at rest (in particular, the movable magnet MM is located in the center C of the tube T when it is at rest).

The coil Bob is powered via square-wave pulses with a duty-cycle of 50% at a frequency between 0.5 and 250 Hz, in particular at a frequency of approximately 5 Hz.

The coils may be driven with square-waves at 50% duty cycle generated by a solid state relay which manages an adapter connected to a high-capacitance capacitor (electrolytic preferably with two diodes at the output to avoid return effects deriving from a powered coil). In particular, a sawtooth or sinusoidal waveform are also acceptable for driving. Furthermore, waveforms with very narrow and high pulses are preferable.

Finally, it is preferable to use coils made of enameled aluminum with respect to those made of enameled copper given the gain in terms of weight.

Since the effective magnetic field percentage generated by the coil is maximum if the coil is perpendicular to the magnet, the coils are preferably perpendicular, not inclined.

The system described herein can be used in the aerospace field.

Here is an example of embodiment: we will consider a 140 mm methacrylate tube T with inner diameter 11 mm, wall thickness 2 mm; at the two ends the tube T there are two "plugs" glued with bicomponent epoxy resin which have plastic screws, 0.75 mm pitch and adjustment washers. Another piece of methacrylate is glued to the bottom of the two screws, to piece the fixed magnet (neodymium magnet with axial magnetization N50 and dimensions: diameter 10 mm, height 17 mm) is glued using bicomponent epoxy resin. So, two magnets, placed so that the north and the south of the magnets fixed to the ends face each other, are glued to the two ends of the tube T.

A third movable magnet, identical to the other two, is placed at the center of the tube and oriented so as to be repelled by the other two which hold it "levitating" in the center of the tube.

Two methacrylate coil-carrying tubes, of length 15 mm and 25 mm respectively, with a wall thickness of 2 mm, are placed with two screws made of plastic material, with pitch of 0.75 mm and adjustment washers. Washers made of plastic material are glued with cyanoacrylate to the ends of the two tubes which make the coils slide in order to hold the wire coils wound; the washers have outer diameter of 50 mm.

The coils are wound with enameled copper wire for transformers, total diameter 0.25 mm. The coils are wound to achieve an overall outer diameter equal to 25 mm.

This device is powered so that at upon ignition of the coils, the central movable magnet is pushed towards the magnet located behind the coil of greater length (that which is 25 mm in length). The two coils are powered in parallel with a voltage of 9 volts and a frequency of 4.37 Hz square-wave with a duty cycle of 50%. The square waves start from 0 volts to 9 volts. The power supply circuit is consisted in prototype phase by an Arduino Nano connected to an IRF540 to generate the square wave and powered by a 9-volt battery. In this manner, the overall system weighs about 90 grams and can displace a weight of 200 grams by pushing it in a linear manner on a table.

Naturally, by applying appropriate scale factors it is possible to make larger systems with higher returns which can be used in different fields and for various applications.

It can be placed inside a satellite mounted on a plate which can move it and orient it at 360° along the horizontal axis and a 360° along the vertical axis so as to be able to move the satellite in all directions.

Having regard to the very low cost of materials, the fact that the coils being in copper also hold the central magnet "levitating", preventing it from touching the tube, and the extremely low consumptions, make it preferable to other types of motors currently used, also not requiring fuel but only electric energy. which can also be taken from solar panels, allows reaching any distance in space. An array of many systems of this type may also be used as a motor for spaceships.

With such a system, being at constant acceleration, allows achieving any speed in space and can be used for space exploration.

System speed can be adjusted by varying frequency and power voltages.

It is possible to conceive similar systems which use an electric field instead of a magnetic field for generating the movement by means of electrostatic phenomena. It is also possible to consider the use of the bifilar coils with double power in which each wire is fed in a different manner in terms of amperage, voltage and frequency and waveform sent and wherein the two pulses may also be sent with mutually reversed polarity. The use of the bifilar coils instead of single-stranded ones makes the management of the accelerations of the system more precise.

Generalizing further, it is possible to conceive a coil with three or more wires, in which each wire is powered in a different manner in terms of amperage, voltage and frequency and waveform.

Laboratory tests have been conducted with the purpose of measuring the forces developed by the system in object by means of load cells. Tests were performed on two different prototypes which implement two different embodiments among those described above.

Figure 19:
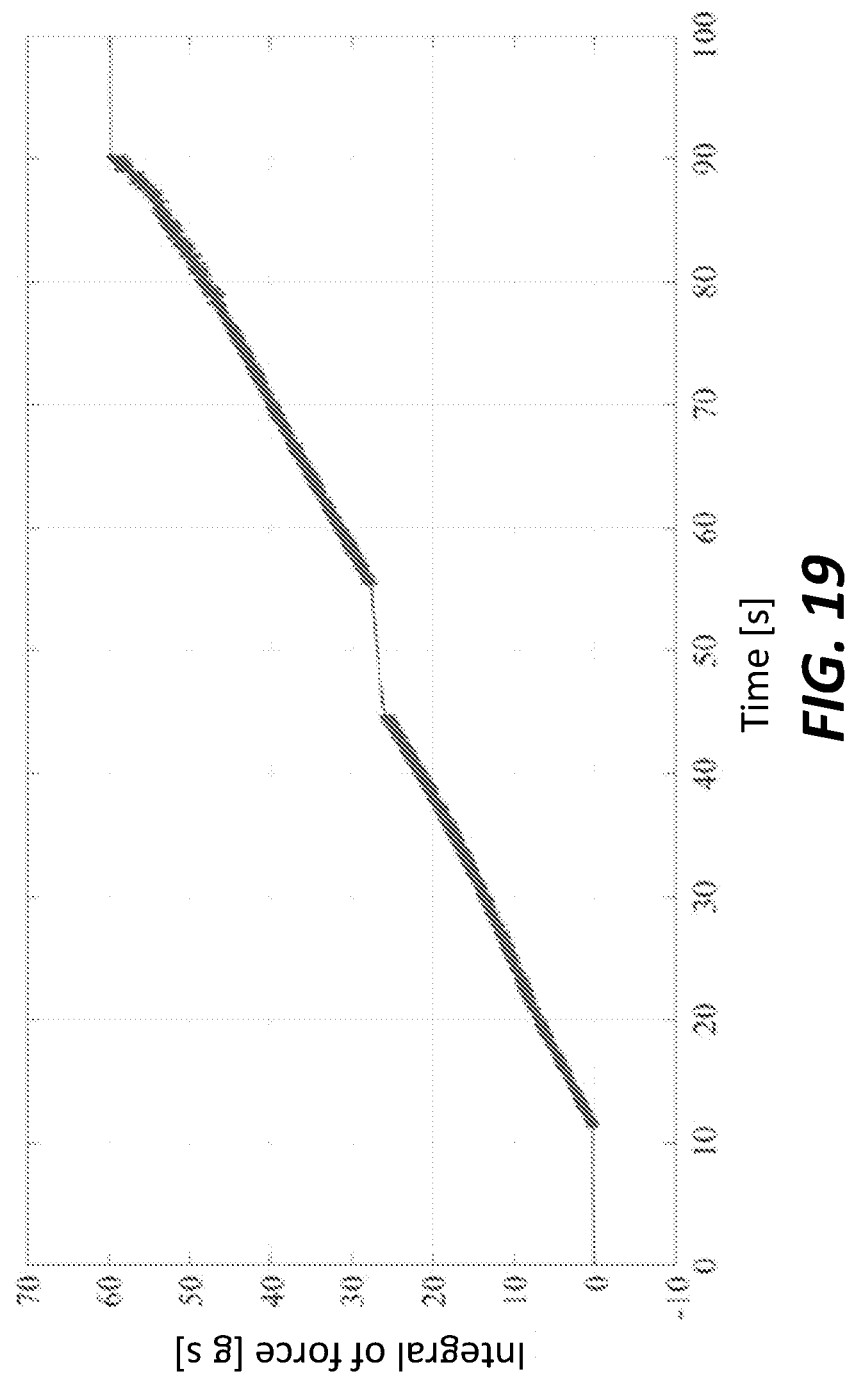
FIG. 19 shows the trend of the integral of the difference of the force measured between two load cells which test the device according to the present invention.

In particular, FIG. 19 shows the time integral of the difference between the readings of the two cells used to measure the reaction of the system to the supplied power. Given the arrangement of the two cells, the mutual difference provides the sum of the forces measured in the same direction. The difference between the readings is divided by two in order to obtain the mean value of the measured forces from the two cells.

Tests have shown that the tested system generates a greater force in one of two directions along the main direction.

We will now describe the formula and the theory underlying this system, which make it possible to have a linear motor which uses an electromagnetically charged body to set the system which comprises it in motion along a main direction.

The formula to derive the suitable frequencies to make the linear motor work correctly was obtained by observing that the most promising frequencies were in relation to the Fibonacci sequence.

An empirical process was followed starting from the theory that can be summarized in the concept of varying the magnetization state of one of the two "fixed" magnets, i.e. the magnets indicated in the figures by reference numerals 20, 40 or MF present at the ends of the motor, to vary the manner in which the fixed magnet interacts with the movable magnet 30 or MM of the motor itself while it moves.

Therefore, the solution is to create a maximum overmagnetization delta of a first fixed magnet, e.g. 20 or MF1, so that it is overmagnetized when the movable magnet 30 or MM is as close to it as possible, and undermagnetized when the movable magnet 30 or MM is as far away from it as possible, i.e. it is near the second fixed magnet 40 or MF2.

The primary coil, indicated by reference numerals 50, Bob, Bob1 in the Figures, in this case has the advantage that when it is off, in the simple case of a single coil motor (e.g. see FIG. 18), it generates an inverse magnetic field which partially cancels the "base-line" magnetic field of the fixed magnet 20 or MF1, which was previously increased or overmagnetized.

More generally, the total sum of the magnetic fields present in the linear motor must be maximum when the movable magnet 30 or MM interacts with the first fixed magnet 20 or MF1, and must be minimal or zero when the movable magnet 30 or MM interacts with the second fixed magnet 40 or MF2.

In the case of the embodiments described above in which there are no fixed magnets MF, the coil 50 becomes an electromagnet when it is powered and being powered in an impulsive manner creates a variable and uneven field which cyclically overmagnetizes and undermagnetizes the movable magnet MM. Since the coil 50 is anchored to the motor body, it can be considered as a real "fixed magnet".

In other embodiments, one or more coils Bob2-BobN with fewer windings than the main coil 50 or Bob1 are constructively added to slow the return time of the movable magnet 30 or MM to the equilibrium position, and then give the time for the main coil 50, Bob or Bob1 to overmagnetize the first fixed magnet 20 or MF1 again.

As the primary coil 50, coils Bob1-BobN also become electromagnets when they are powered, and being powered in an impulsive manner, create a series of variable and uneven fields which cyclically overmagnetize and undermagnetize the movable magnet MM. Since the coils are anchored to the motor body, they can be considered as real "fixed magnets" MF.

In the conducted experiments, given the necessary pulses, we opted in the first instance for the simplest of pulse waveforms, namely a square wave.

The frequencies suitable for the movement of the linear motor were obtained through a square wave generator with duty cycles variable between 1 and 99%, and the frequency range used was set between 0.01 Hz and 1000 Hz (with an accuracy of 0.01 Hz).

The system was powered by a 0-30 volt/0-5 Amp low-impedance power supply. The 0-30 volt/0-5 Amp low-impedance power supply was obtained by placing a flash-type electrolytic capacitor, with a high capacity of 22,000 µF, in parallel with an adjustable power supply.

A "basic", generically effective frequency was empirically sought and found, which appears to be independent of the geometrical construction parameters of the motor equal to 4.37 Hz (with duty cycles 50%) and from that we started to search for the various harmonics and analyze them.

Once the base harmonics were identified, by multiplying or dividing the base frequency by integers, we sought the intermediate numbers to be analyzed, checking the results and we proceeded in this manner.

There appear to be numerical ratios between the various frequencies analyzed and found to be generically effective (i.e. theoretically independent of the motor construction parameters).

The numerical relationships analyzed led to the following formula for calculating frequencies in Hz.

$$\Omega = A \cdot f(N)$$

where $A \in \mathbb{N} \; 1 \leq A \leq 5$ and where $N \in \mathbb{N} \; 1 \leq N \leq 100$ wherein $$f(N) = \begin{cases} f^1(N) \, se \, N = 2k+1 \\ f^2(N) \, se \, N = 2k \end{cases}$$

and where $k \in \mathbb{Z}$
and where the functions are defined, in particular, as $$f^1(N) = \left\{ \left(\sqrt{2} \cdot N\right) + (V_c \cdot 10^{-1}) + \left[0{,}005 \cdot \left(1 + \left\lfloor \frac{N}{2} \right\rfloor\right)\right] \right\} \pm g^1(n)$$

$$f^2(N) = \left\{ \left(\sqrt{2} \cdot N\right) + (V_c \cdot 10^{-1}) - \left[0{,}004 \cdot \left(1 + \frac{N}{2}\right)\right] \right\} \pm g^2(n)$$

where $V_c$ = costante di Viswanath $\cong 1{,}13198824$

Any frequency $\Omega$ indicated in Hz can be obtained by multiplying a natural integer "A" (preferably but not limited to between 1 and 5) by a function "f(N)" dependent on a variable "N" which is a natural number between 1 and 100.

The function "f(N)" comprises two different functions "f¹ (N) and f² (N)" depending on the "N" number chosen, i.e. whether the "N" number chosen is odd or even.

The functions "f(N)", being derived functions will be indicated as the function of "N", but with the addition of a number at the apex to distinguish them and to make their derivation according to standard mathematical formalism comprehensible and evident.

The variable "k", which is any integer, is introduced to define the function "f(N)". The two derived functions to apply will thus be "f¹ (N)", if the number "N" is an odd number formally indicated as "2k+1", while the function "f² (N)" will be used if the number "N" is an even number formally indicated as "2k".

We will now specifically define the functions "f¹ (N) and f² (N)" which are simple 1st degree equations.

The function is obtained by multiplying by the root of 2 the number "N" chosen, and to the result is added the product result of a variable "Vc", known as the Viswanath variable and equal to approximately 1.13198824 times 10 elevated to −1.

For the function "f¹ (N)", we add the result of 0.005 multiplied by the sum of 1 plus the lowest integer obtained from the division of "N" by 2.

For the function "f² (N)", we subtract the result of 0.004 multiplied by the sum of 1 plus the result of the division of "N" by 2.

Each of the two functions "f¹ (N) and f² (N)" then comprises a second corrective function which defines and corrects the call function "g(n)", which is different according to on whether it is "f¹ (N) or f² (N)".

$$g^1(n) = \frac{n}{2} \cdot f^1(N) \cdot 10^{-2}$$

$$g^2(n) = \frac{n}{2} \cdot f^2(N) \cdot 10^{-2}$$

where $n \in \mathbb{N} \; 0 \leq n \leq 30$

The corrective function "g(n)" is inserted to avoid redundancies; indeed, as can be seen from the definition of "g¹ (n) and g² (n)" itself, they both depend on the same function "f(N)" in which they are inserted.

The functions "g¹ (n) and g² (n)" also depend on a variable "n" which is an integer between 0 and 30.

So, by inserting in the function "f(N)" the various values of the three variables "A", "N", "n" and deciding whether to add or subtract the function "g(n)", which is a corrective function of "f(N)", you get the various numbers in a linear and simple manner.

Example: A=2, N=3 and n=3 in the above formula gives 8.6 Hz. Same thing can be done for 4.37 Hz by placing for the variables A=1, N=3 and n=0.

The motor described here can generate a thrust on itself if powered by a variable DC pulse generator, repetitive or unbalanced (with duty cycles from 10 to 90%) using any $\Omega$ frequency in Hz derived from the above formula.

Applying these impulses creates a net, non-zero thrust which depends predominantly on the frequencies and secondarily on the applied waveform.

As previously mentioned, square waves, sawtooth or semi-wave sinusoidal waves, or patterns variable in amplitude and shape over time, as long as they are impulsive and at the indicated frequencies, can be used.

The variation of the voltage parameters mainly and secondarily, but to a much lesser extent, of the amperage parameters, bias the motor in some manner being able to adjust the direction of movement thereof.

In brief, all the frequencies obtained from the aforesaid formula are effective at movement, but the characteristic construction parameters of the single motor thus determine its efficiency and directional response.

In other words, the same frequency obtained can make two motors move in different manners (for one or more parameters) one forward and one backward, or one forward fast and one forward slowly.

Non-zero thrusts, i.e. integral thrusts of forces different from zero, are obtained from the aforesaid formula by applying the frequencies. By applying other frequencies results in zero forces and therefore simple vibrations, as in the solutions described in the previously quoted documents.

On an empirical level, various tests were made with motors of three different sizes. For example, using a 140 mm long device with three different internal diameter sizes of 11, 16, and 21 mm, made of transparent methacrylate, with magnets fixed at the ends, glued with two-component epoxy glue on adjustable supports with plastic screws (pitch 1 mm) to vary the relative distances between the magnets). The magnets were 1 mm smaller than the diameter used. Neodymium magnets with N52 magnetization were used.

The length of the magnets used was between one and a half times and twice the diameter of thereof, to avoid overturning or reversing inside the tube.

The devices were constructed using a coil placed on a support adjustable by means of a plastic screw so that the coil could slide and be positioned along the entire length of the tube.

Basically, supports for the above mentioned devices were built by digging and gluing Styrodur C and Styrodur 3035 (a type of polystyrene used in building panels), using the flat and smooth side as a low-friction surface and were placed over a plastic support with a low friction index.

Various frequencies and conformations were used, and it was noted that some numbers appeared recursive, regardless of conformation and motor. So, it was assumed that there was a base frequency and that this frequency could generate movement to a greater or lesser extent and after many attempts the value 4.37 Hz was found.

By testing the various multiples and submultiples, we noticed that they all generated a displacement.

Some test prototypes were then built with longer tubes (up to 280 mm) and shorter tubes (up to 70 mm) to test that parameter as well.

Finally, tests were performed with lubricants of various types to see whether the effect could be seen better with lower friction and it was seen that the frequencies described in the formula generate the movement of the motor, in one direction or another. While other frequencies only generate vibrations by making it oscillate in place. We also tried to use the same frequencies with other waveforms, and they appeared to work.

The preferred frequencies can all be derived from the equation, with particular interest in frequencies below 100 Hz, because it is easier to obtain a motor optimized for those frequencies.

The inertial mass of an object varies with the variation of its magnetic field and therefore a variation of inertia can be created which leads to the generation of mass by varying the magnetization of the motor and its constituent elements (at given times, as explained above).

That is to generate a first impact at high inertia or "increased mass" and a second impact at "reduced mass", this "mass" delta generates a variation of inertia which allows the object to move generating an outward force.

Therefore, the variation of mass in precise moments is of the utmost importance, otherwise simple vibration and not movement is obtained if those moments are not respected.

So, the motor can be considered as a particular type of variable mass motor (like a rocket), in which the variation of "mass" is generated by the overmagnetization or undermagnetization of the motor itself in conjunction with given "shocks" or interactions between the magnetic piston and the two buffer magnets (we speak of interactions and not real shocks because they do not have to collide to interact, but only get very close and repel each other through magnetic repulsion).

Finally, it is possible to conceive alternative embodiments in which gas or plasma is used as the mobile mass inside the system instead of the mobile magnet.

Of course, notwithstanding the principle of the invention, the details of construction and embodiments may vary widely with respect to that described and illustrated purely by way of example, without because of this departing from the scope of the present invention.

The invention claimed is:

1. A system for generating a linear movement, comprising an electromagnetically charged body free to move along a main direction, at least one static field generator, and at least two buffer elements, wherein a movement of said electromagnetically charged body along said main direction is controlled by the static field generator and by the buffer elements, and wherein said static field generator is alternately powered with a power profile such as to generate a displacement of the system in one of the two ways along said main direction and wherein the system is supplied with a bias which has a frequency $\Omega$ that can be obtained by means of the following formula:

$$\Omega = A \cdot f(N)$$

with $A \in \mathbb{N}\ 1 \leq A \leq 5$ with $N \in \mathbb{N}\ 1 \leq N \leq 100$ $$f(N) = \begin{cases} f^1(N) \text{ if } N = 2k+1 \\ f^2(N) \text{ if } N = 2k \end{cases}$$

with $k \in \mathbb{Z}$;

wherein $N$ is a set of natural numbers;

$Z$ is a set of integer numbers; and $k$ is an integer number $k \in Z$ $$f^1(N) = \left\{ (\sqrt{2} \cdot N) + (V_c \cdot 10^{-1}) + \left[ 0.005 \cdot \left(1 + \left\lfloor \frac{N}{2} \right\rfloor\right) \right] \right\} \pm g^1(n)$$

$$f^2(N) = \left\{ (\sqrt{2} \cdot N) + (V_c \cdot 10^{-1}) - \left[ 0.004 \cdot \left(1 + \frac{N}{2}\right) \right] \right\} \pm g^2(n)$$

with $V_c$ = Viswanath constant $\cong 1.13198824$ $$g^1(n) = \frac{n}{2} \cdot f^1(N) \cdot 10^{-2}$$

with $g^2(n) = \frac{n}{2} \cdot f^2(N) \cdot 10^{-2}\ n \in \mathbb{N}\ 0 \leq n \leq 30$.

2. The system for generating a linear movement according to claim 1, wherein said electromagnetically charged body is a movable magnet, which slides inside a hollow tube closed at its two ends, said two buffer elements are mechanical bumpers made of an elastic material and positioned at the two ends of the tube, and said static field generator is a coil, which further acts as a fixed magnet.

3. The system for generating a linear movement according to claim 1, wherein said electromagnetically charged body is a movable magnet, which slides inside a hollow tube closed at two ends, said two buffer elements are springs positioned at the two ends of the tube, and said static field generator is a coil, which further acts as a fixed magnet.

4. The system for generating a linear movement according to claim 1, wherein said electromagnetically charged body is a movable magnet, which slides inside a hollow tube closed at two ends, said two buffer elements comprise a system of springs positioned at the two ends of the tube which hold said movable magnet in a position of equilibrium, and said static field generator is a coil, which further acts as a fixed magnet.

5. The system for generating a linear movement according to claim 1, wherein said electromagnetically charged body is a movable magnet, which slides inside a hollow tube closed at two ends, said two buffer elements are two fixed magnets positioned at the two ends of the tube, wherein said two fixed magnets are positioned so as to hold said movable magnet in a position of equilibrium, and said static field generator is a coil, which further acts as a fixed magnet.

6. The system for generating a linear movement according to claim 1, wherein said electromagnetically charged body is a movable magnet, which slides on a central pin, said two buffer elements are two fixed magnets positioned at two ends of the central pin, wherein said two fixed magnets are positioned so as to hold said movable magnet in a position of equilibrium, and said static field generator is a coil which further acts as a fixed magnet.

7. The system for generating a linear movement according to claim 1, wherein said static field generator comprises a plurality of coils powered separately, which further acts as a fixed magnet.

8. The system for generating a linear movement according to claim 1, wherein said static field generator comprises a plurality of coils powered together, which further act as a fixed magnet.

9. The system for generating a linear movement according to claim 1, wherein said static field generator is powered with square-wave or sinusoidal or sawtooth power profile.

10. The system for generating a linear movement according to claim 1, wherein a diamagnetic cover is present which works as a "magnetic brake" to decelerate the movement of the electromagnetically charged body during a step of returning to a position of equilibrium.

11. The system for generating a linear movement according to claim 1, wherein a central tube made of diamagnetic material is present, which works as a "magnetic brake" to decelerate the movement of the electromagnetically charged body during a step of returning to a position of equilibrium.

\* \* \* \* \*